United States Patent [19]

Okada

[11] E Patent Number: Re. 32,501

[45] Reissued Date of Patent: Sep. 15, 1987

[54] ROTARY CUTTER

[75] Inventor: Yoshio Okada, Osaka, Japan

[73] Assignee: Okada Kogyo Kabushiki Kaisha, Osaka, Japan

[21] Appl. No.: 830,886

[22] Filed: Feb. 19, 1986

Related U.S. Patent Documents

Reissue of:

[64] Patent No.: 4,432,137
Issued: Feb. 21, 1984
Appl. No.: 408,718
Filed: Aug. 16, 1982

[30] Foreign Application Priority Data

Sep. 29, 1981 [JP] Japan ..... 56-145180[U]

[51] Int. Cl.[4] ..... B26B 3/00

[52] U.S. Cl. ..... 30/292; 30/307; 30/319

[58] Field of Search ..... 30/292, 307, 319, 164.95, 30/347; 128/305; 411/424, 166, 116-124

[56] References Cited

U.S. PATENT DOCUMENTS

| | | | |
|---|---|---|---|
| 1,964,366 | 6/1934 | Schwartz | 30/292 |
| 2,673,396 | 3/1954 | Beres | 30/292 |
| 3,032,281 | 5/1962 | Wexell | 411/424 X |
| 4,020,550 | 5/1977 | Okada | 30/292 |
| 4,301,594 | 11/1981 | Okada | 30/292 X |

*Primary Examiner*—Frederick R. Schmidt
*Assistant Examiner*—Debra S. Meislin
*Attorney, Agent, or Firm*—Wenderoth, Lind & Ponack

[57] ABSTRACT

A rotary cutter which includes an elongated handle having an aperture extending through its one end, a shaft extending through the aperture so as to be supported by the handle, a disc blade rotatably mounted on the shaft and lying in a plane perpendicular to the longitudinal axis of the shaft, and a member engageable with the shaft, with a bearing projection formed on the handle coaxially with the aperture.

16 Claims, 15 Drawing Figures

ROTARY CUTTER

Matter enclosed in heavy brackets [ ] appears in the original patent but forms no part of this reissue specification; matter printed in italics indicates the additions made by reissue.This is a reissue application of U.S. Pat. Ser. No. 4,432,137 which matured from Ser. No. 408,718, filed Aug. 16, 1982.

BACKGROUND OF THE INVENTION

The present invention generally relates to a cutter and more particularly to a handy rotary cutter comprising a generally elongated handle and a disc blade rotatably carried by the handle at one end thereof, in which a frictional force is applied to the disc blade so as to prevent a free, arbitrary rotation of the disc blade during the cutting operation.

In the case where the disc blade is freely rotatable in the rotary cutter, the user or operator of the rotary cutter has to adjust the amount of a cutting force to be applied through the cutter to a material to be cut during the cutting operation and, at the same time, to adjust or control carefully the direction in which the cutting is to be performed. Unless care is taken in adjusting the amount of the cutting force and the cutting direction, the disc blade often runs over the material to be cut independently of the user's will even when a slight force is applied to the disc blade through the handle, resulting in possible excessive cutting and damage to an area of the material not to be cut.

In order to prevent a free, arbitrary rotation of the disc blade, it has been so arranged in conventional rotary cutters that a biasing member such as a leaf spring, a coiled spring, an elastic rubber block or an elastomer block is provided for biasing the disc blade against the handle so as to apply a frictional force to the disc blade whereby, during the cutting operation, the disc blade may be rotated in contact with the material to be cut in a controlled manner, that is, without any arbitrary rotation. However, the conventional rotary cutters have the disadvantage that the components of the cutter are disadvantageously increased in number, thus resulting in an increase in its manufacturing cost.

SUMMARY OF THE INVENTION

Accordingly, an essential object of the present invention is to provide an improved handy rotary cutter in which a disc blade itself is utilized as an elastic member for applying a frictional force to the disc blade so as to prevent a free, arbitrary rotation of the disc blade, with substanital elimination of the disadvantages inherent in conventional handy rotary cutters of this kind.

Another important object of the present invention is to provide an improved handy rotary cutter of the above described type which is simple in structure, highly reliable in actual use and suitable for mass production at low cost.

In accomplishing these and other objects according to one preferred embodiment of the present invention, there is provided an improved handy rotary cutter which comprises an elongated handle *having a platform at one end thereof* formed with an aperture extending [through one end thereof] *therethrough*, a shaft extending through the aperture so as to be supported by the handle, a disc blade *having a central opening*, rotatably mounted on the shaft and lying in a plane extending perpendicular to the [the] longitudinal axis of the shaft, and *a securing means or* member engagable with the shaft, with *an outwardly projecting bearing means* or [a bearing] projection formed on the [handle] *platform* coaxially with the aperture for *bearing against an inner surface of the disc blade*. The shaft has a head portion *for bearing against an outer surface of the disc blade.* When the disc blade is mounted on the [handle] *platform* by the shaft and the [shaft engageable member] *securing means*, so as to be interposed between the head portion of the shaft and the bearing [projection] *means* so that the disc blade *is frictionally supported between the bearing means and the head portion, the disc blade* may be *urged toward the platform by the securing means so that the disc blade is* subjected to curved elastic deformation[,] *and* a frictional force is adjustably applied to the disc blade in a direction substantially perpendicular thereto and thus, the disc blade can be rotated in a controlled manner in contact with a material to be cut.

In accordance with the present invention, the frictional force can be adjustably and easily applied to the disc blade through elastic deformation of the disc blade without necessity for additionally providing the biasing member therefor and thus, the components of the cutter are decreased in number, thereby resulting in reduction in the manufacturing cost, decrease in occurrence of malfunctioning, and ease in replacement of the components.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
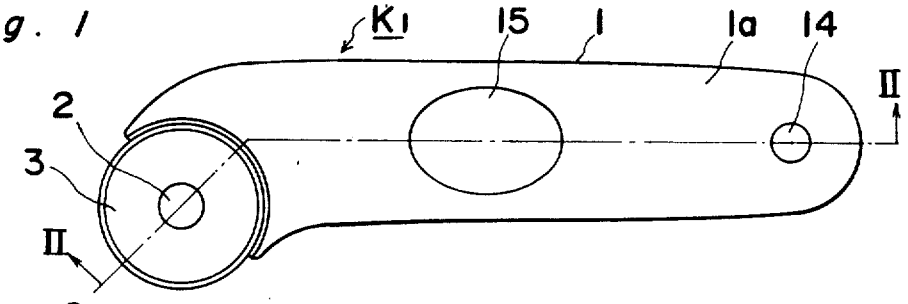
FIG. 1 is a top plan view of a rotary cutter according to a first preferred embodiment of the present invention.
Figure 2:
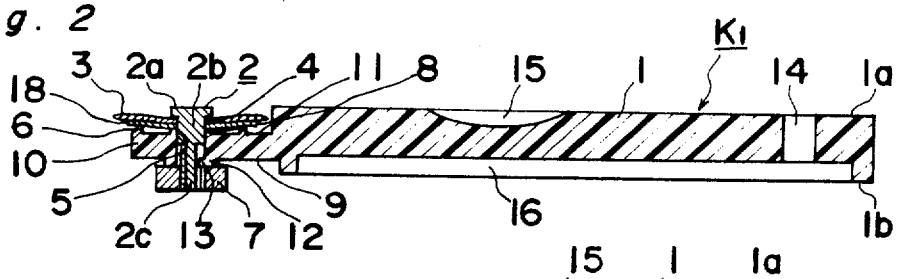
FIG. 2 is a cross-sectional view taken along the line II—II in FIG. 1.
Figure 3:
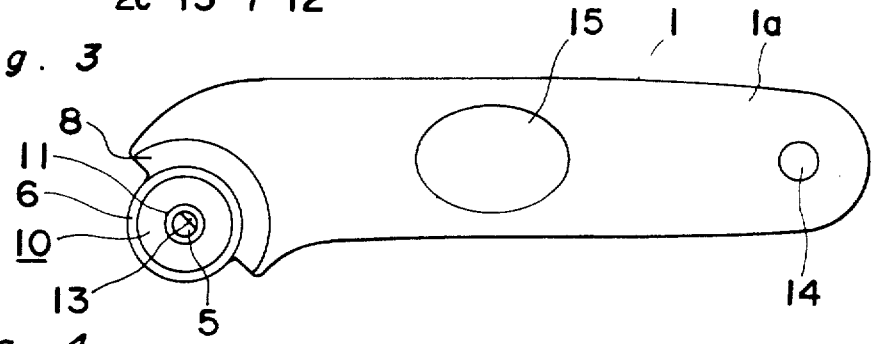
FIG. 3 is a top plan view of a handle employed in the rotary cutter of FIG. 1.
Figure 4:
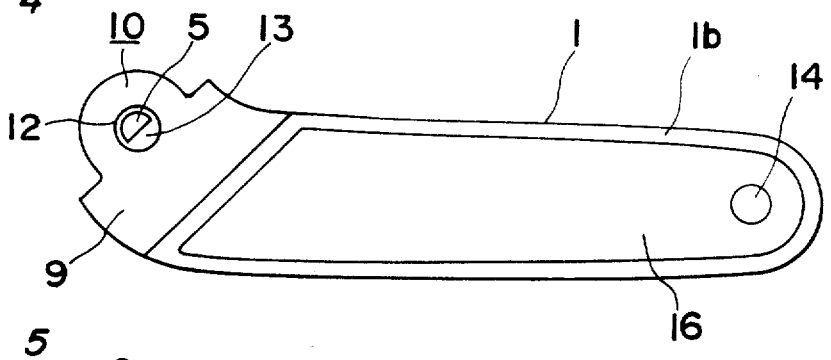
FIG. 4 is a bottom plan view of the handle of FIG. 3.

Referring now to the drawings, there is shown in FIGS. 1 to 5, a rotary cutter K1 according to a first preferred embodiment of the present invention, which comprises a handle 1 of a generally elongated plate-like configuration, a shaft 2 supported by the handle 1, and a disc blade 3 rotatably mounted on the shaft 2. The handle 1 has a pair of opposed flat surfaces 1a and 1b and one end formed with an eye 14 for engagement with a hook or any other connecting element. The other end of the handle 1 is inclined with respect to the longitudinal axis of the handle 1 and is integrally formed with a generally circular platform 10 having opposed surfaces 8 and 9 which are recessed from the surfaces 1a and 1b, respectively. As best shown in FIGS. 3 and 4, the handle 1 is provided with circular bosses 11 and 12 which are formed coaxially on, *and so as to project from,* the surfaces 8 and 9, respectively. Further, an annular bearing projection 6 is formed on, *and projects from,* the surface 8 coaxially with the boss 11 in such a manner that the bearing projection 6 is disposed slightly higher, in level from the surface 8, than the boss 11. The bearing projection 6 has an outside diameter larger than that of the boss 11 but smaller than that of the disc blade 3. [An] *A central* aperture 5 is formed so as to extend through the center of the bosses 11 and 12, and the aperture 5 is further provided with a projection 13 for preventing the rotation of the shaft 2 in such a manner that the projection 13 extends, a slight distance inwardly from the boss 12, in the axial and radial directions of the aperture 5 so as to form a chord of the aperture 5. It is to be noted that the platform 10 is so formed as to permit a portion of the peripheral cutting edge of the disc blade 3 to protrude outwardly of the periphery of the platform 10. The handle 1 is formed with an elliptic recess 15 on the surface 1a approximately at the longitudinal and lateral centers of the handle 1 and with an elongated recess 16 on the surface 1b. It should be noted that the handle 1 is manufactured by the utilization of any known plastic molding technique, for example, either extrusion molding method or an injection molding method.

The disc blade 3 having a central opening 4 is rotatably mounted on the platform 10 by means of the shaft 2 and a nut 7.

The disc blade 3 is made of heat treated alloy tool steel, SKS7 (equivalent to AISIO7) and has a thickness of 0.3 mm.

Figure 5:
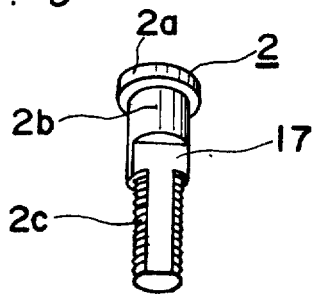
FIG. 5 is a perspective view of a shaft employed in the rotary cutter of FIG. 1.
Figure 6:
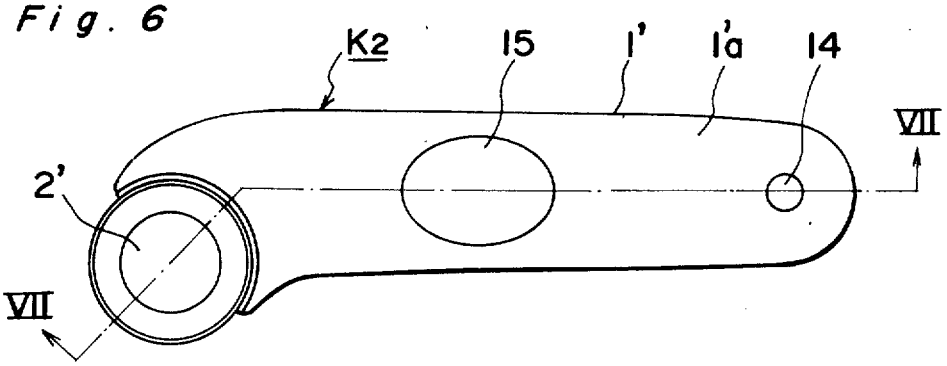
FIG. 6 is a view similar to FIG. 1, showing a rotary cutter according to a second preferred embodiment of the present invention.

As shown in FIGS. 2 and 5, the shaft 2 consists of, sequentially in a decreasing order of diameter, a flat circular head 2a, a non-threaded stud 2b and a threaded stud 2c, engageable with the nut 7 and is heat treated. The shaft 2 is formed with a flat cut-off portion 17 extending in the axial direction thereof from one end of the shaft 2 opposite to the flat head 2a into the non-threaded stud 2b by a slight distance so that the flat cut-off portion 17 may be engaged with the projection 13 of the handle 1 for preventing rotation of the shaft 2 in an assembled condition of the rotary cutter K1.

In the assembled condition of the rotary cutter K1, the non-threaded stub 2b extends through the central opening 4 of the disc blade 3 and then through the aperture 5 of the handle 1 so that the threaded stud 2c may project out of the boss 12 with the flat head 2a positioned on one side of the disc blade 3 remote from the boss 11. The nut 7 is engaged with the threaded stud 2c projecting out of the boss 12. When the disc blade 3 is secured to the handle 1 through engagement of the shaft 2 by the nut 7, a *central* portion of the *outer surface of the* disc blade 3 adjacent to the central opening 4 is urged towards the boss 11 by the flat head 2a of the shaft 2, while a peripheral portion of *the inner surface of* the disc blade 3 is supported by the bearing projection 6 with the disc blade 3 interposed between the flat head 2a of the shaft 2 and the bearing projection 6. Since the bearing projection 6 is disposed higher, in level from the surface 8, than the boss 11 as described above, the portion of the disc blade 3 adjacent to the central opening 4 is subjected to curved elastic deformation. However, since the peripheral portion of the disc blade 3 is supported by the bearing projection 6 as described above, the peripheral portion of the disc blade 3 outside the bearing projection 6 is held substantially parallel to the surface 8 as shown in FIG. 2 and thus, a frictional force is adjustably applied to the disc blade 3 in the axial direction of the shaft 2, whereby the disc blade 3 can be rotated in a controlled manner in contact with a material to be cut. When the disc blade 3 is brought into contact with the boss 11, the disc blade 3 is supported by the boss 11 in addition to the bearing projection 6, so that it becomes possible to perform a heavy duty cutting operation, whereby various materials such as sheets of cloth, rubber, leather, paper film, lead, etc. can be cut efficiently by either pushing or dragging the rotary cutter K1.

It is to be noted that, in the assembled condition of the rotary cutter K1, the flat cut-off portion 17 of the shaft 2 is engaged with the projection 13 of the handle 1 so as to prevent rotation of the shaft 2, so that the stable rotation of the disc blade 3 can be achieved.

The elliptic recess 15 on the surface 1a and the elongated recess 16 on the surface 1b are provided for easier operation of the rotary cutter K1 through their engagement with the operator's fingers.

If desired, as shown in FIG. 2, a nylon washer 18 may be employed between the disc blade 3 and the bearing projection 6 of the handle 1 for smoother rotation of the disc blade 3. However, if the shaft 2 is made of oleoresin and the like, the nylon washer 18 can be omitted.

Referring to FIGS. 6 to 9, there is shown a rotary cutter K2 according to a second preferred embodiment of the present invention. In the rotary cutter K2, the annular bearing projection 6 described as formed on the surface 8 of the handle 1 of the rotary cutter K1 in the first embodiment of FIGS. 1 through 5 is omitted, and the flat circular head 2a of the shaft 2 of the rotary cutter K1 in the first embodiment is also replaced by an annular head 2'a of a shaft 2'. Since other constructions of the rotary cutter K2 are the same as those of the rotary cutter K1 in the first embodiment, detailed description thereof is abbreviated for brevity of description.

Figure 7:
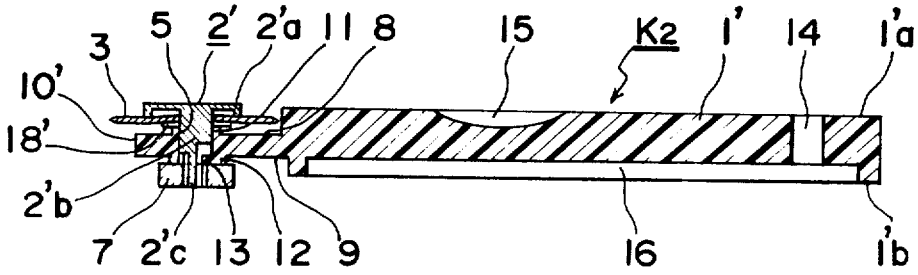
FIG. 7 is a cross-sectional view taken along the line VII—VII in FIG. 6.
Figure 8:
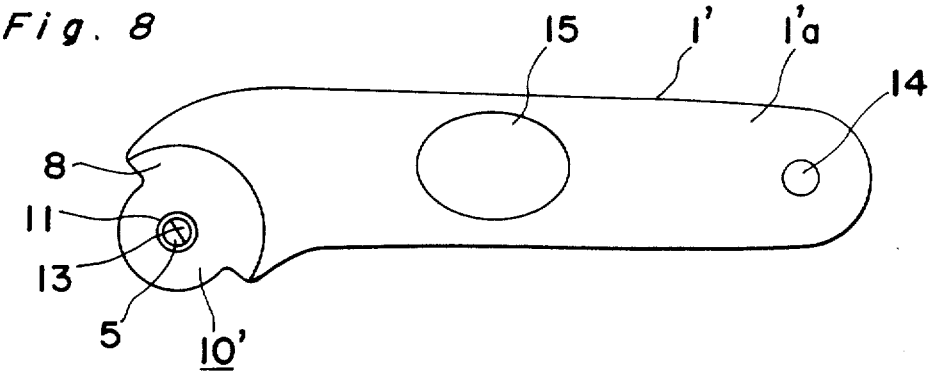
FIG. 8 is a view similar to FIG. 3, showing a handle employed in the rotary cutter of FIG. 6.
Figure 9:
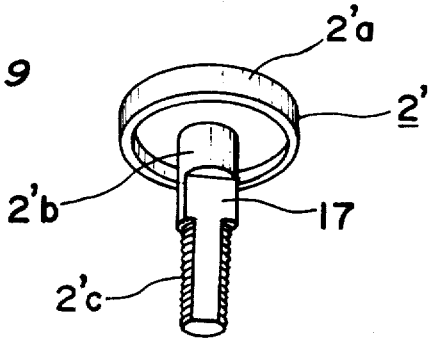
FIG. 9 is a view similar to FIG. 5, showing a shaft employed in the rotary cutter of FIG. 6.
Figure 10:
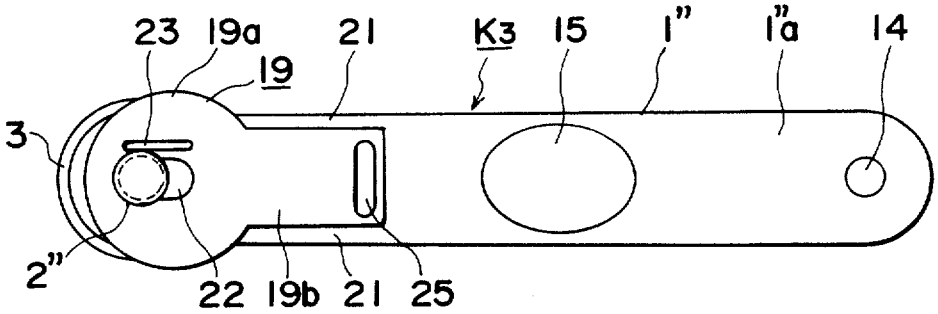
FIG. 10 is a view similar to FIG. 1, showing a rotary cutter according to a third preferred embodiment of the present invention, with a safety cover positioned in an exposing position.
Figure 11:
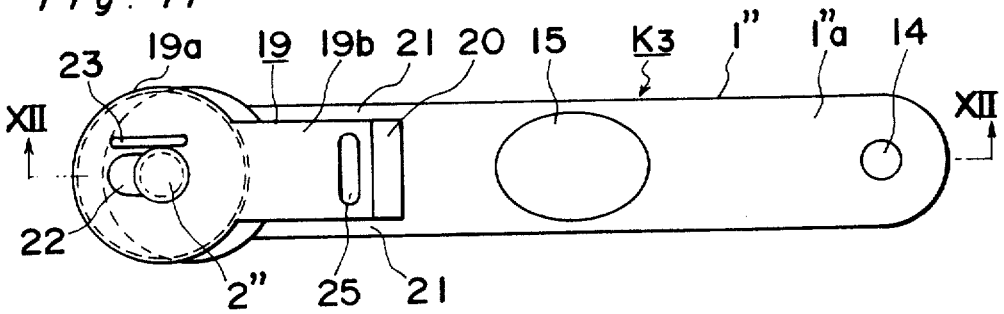
FIG. 11 is a view similar to FIG. 10, showing the rotary cutter of FIG. 10, with the safety cover held in a concealing position.
Figure 12:
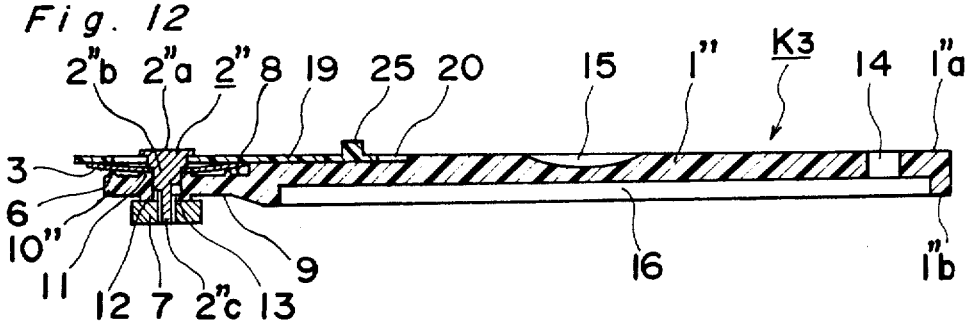
FIG. 12 is a cross-sectional view taken along the line XII—XII in FIG. 11.
Figure 13:
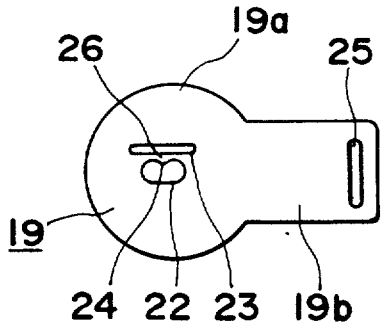
FIG. 13 is a top plan view of the safety cover employed in the rotary cutter of FIG. 10, and FIGS. 14(a) and 14(b) are top plan views of disc blades having cutting edges of various profiles which can be employed in the rotary cutter of the present invention.

As best shown in FIGS. 7 and 9, the annular head 2'a of the shaft 2' has an outside diameter larger than that of the boss 11 but smaller than that of the disc blade 3. Since the annular portion of the annular head 2'a is directed towards a threaded stud 2'c, a portion of the disc blade 3 inside the annular head 2'a is urged towards the surface 8 by the annular head 2'a while a portion of the disc blade 3 adjacent to the central opening 4 is supported by the boss 11 *as a bearing means* in the assembled condition of the rotary cutter K2, whereby the portion of the disc blade 3 inside the annular head 2'a is subjected to curved elastic deformation with a peripheral portion of the disc blade 3 outside the annular head 2'a being held substantially parallel to the surface 8.

Referring now to FIGS. 10 to 13, there is shown a rotary cutter K3 according to a third preferred embodiment of the present invention. In the rotary cutter K3, a safety cover 19 for covering the disc blade 3 when not in use is slidably provided on the disc blade 3. The safety cover 19 is made of plastic material and includes a disc portion 19a having a diameter larger than that of the disc blade 3, and a rectangular portion 19b. For easier operation of sliding movement of the safety cover 19, a platform 10" is formed approximately in alignment with the longitudinal axis of a handle 1". The handle 1" is formed with a rectangular recess 20 on a surface 1"a so as to receive the rectangular portion 19b therein for sliding movement of the safety cover 19 with a pair of opposed guide walls 21, one on each side of the recess 20. The rectangular portion 19b has a rectangular projection 25 for manipulation of the safety cover 19 by the operator while the disc portion is provided with a guide slot 22 extending in alignment with the longitudinal axis of the rectangular portion 19b, an escapement slot 23 in parallel with the guide slot 22. The guide slot 22 has a lobe 24 defined on one side edge of the guide slot 22 adjacent the escapement slot 23 and protruding a predetermined distance laterally into the guide slot 22. Since the present inventor has disclosed a rotary cutter provided with a safety cover of the above-described configuration in U.S. Pat. No. 4,301,594 patented Nov. 24, 1981, detailed description of the safety cover is abbreviated for brevity. By the above arrangement, the rectangular portion 19b is fitted into the rectangular recess 20 with a shaft 2" extending through the guide slot 22, for sliding movement of the safety cover 19 in opposite directions longitudinally of the handle 1" between an exposing position (FIG. 10), whereat a portion of the periphery of the disc blade 3 is exposed for cutting, and a concealing position (FIGS. 11 and 12), whereat the portion of the periphery of the disc blade 3 is concealed by the disc portion 19a of the safety cover 19.

Figure 14:
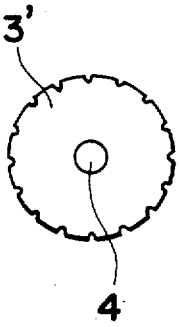
Figure 14:
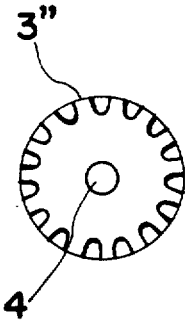

Furthermore, in addition to the disc blade 3 having a continuous circular cutting edge, there can be employed a disc blade 3' having a sawtoothed cutting edge for perforated cutting (FIG. 14(a)) and a disc blade 3" having a cutting edge corrugated in a direction perpendicular to the plane of the disc blade 3" for corrugated trimming (FIG. 14(b)).

As is clear from the foregoing description, in accordance with the present invention, a frictional force can be adjustably and easily applied to the disc blade through elastic deformation of the disc blade itself so as to avoid any possible overrun of the disc blade during the cutting operation without necessity for additionally providing a biasing member therefor and thus, the components of the cutter are decreased in number, thereby resulting in reduction in the manufacturing cost, decrease in occurrence of the malfunctioning, and ease in replacement of the components. Morover, in accordance with the present invention, since a braking force is applied to the disc blade through elastic deformation thereof, the disc blade is maintained remarkably stable during the cutting operation and therefore, is increased in the cutting strength, whereby the cutting operation can be remarkably easily performed by pushing or dragging the rotary cutter through simple adjustment of the elastic deformation of the disc blade in accordance with materials and thicknesses of items to be cut.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed therein.

What is claimed is:

1. A rotary cutter comprising:

*a disc blade having a central opening;* an elongated handle having, *at its one end, a platform for rotatably supporting said disc blade, said platform having* an aperture extending *therethrough and a bearing means for frictionally supporting an inner surface of said disc blade at only one of a central portion and a peripheral portion of said disc blade said inner surface at the other of said central portion and said peripheral portion being unsupported;* [through one end thereof;

said handle being formed with a bearing projection coaxial with said aperture;]

a shaft [having] *which extends through the central opening of said disc blade and the aperture of said platform and which has, at its one end,* a head portion [at one end thereof], which [extends through said aperture so as to be supported by said handle] *frictionally supports an outer surface of said disc blade only at the other one of the central portion and the peripheral portion of the disc blade, said outer surface of the one of said central portion and said peripheral portion being unsupported; and*

[a disc blade having a central opening, which is rotatably mounted on said shaft in a plane perpendicular to the longitudinal axis of said shaft with said shaft extending through said central opening so that said disc blade may be caused to roll on a material to be cut during a cutting operation;

said disc blade being interposed between said head portion and said bearing projection, said bearing projection and said head portion respectively bearing on said disc blade at radially spaced locations on opposite sides of said disc blade; and]

a [fastening member engageable with] *securing means for securing* said shaft [for urging said head portion against] *to said platform so as to urge* said disc blade [so as to urge said disc blade against said bearing projection, whereby] *towards said platform such that* said disc blade is subjected to curved elastic deformation [between said radially spaced locations and is caused to rotate in the curved state].

2. A rotary cutter as claimed in claim 1, wherein said bearing [projection] *means* is a ring and said head portion is a flat circular head, said ring being larger, in inside diameter, than said flat circular head, whereby [a] *the central* portion of said disc blade adjacent to said central opening is subjected to said curved elastic deformation and [a] *the* peripheral portion of said disc blade outside said ring is held substantially perpendicular to the longitudinal axis of said shaft.

3. A rotary cutter as claimed in claim 1, wherein said bearing [projection] *means* is a circular boss having said aperture formed at the center thereof and said head portion is an annular head, *having a central opening larger than said circular boss* said circular boss being smaller, in outside diameter, than said annular head, whereby [a] *the central* portion of said disc blade adjacent to said central opening is subjected to said curved elastic deformation and [a] *the* peripheral portion of said disc blade outside said annular head is held substantially perpendicular to the longitudinal axis of said shaft.

4. A rotary cutter as claimed in claim 2, further including a safety cover having a diameter greater than that of said disc blade, said safety cover having therein a guide slot, said safety cover being mounted at said one end of said handle, with said shaft extending through said guide slot, for sliding movement in opposite directions longitudinally of said handle between an exposing position, whereat a portion of the periphery of said disc blade is exposed for cutting, and a concealing position, whereat said portion of said periphery is concealed by said safety cover.

5. A rotary cutter as claimed in claim 1, 2, 3 or 4, wherein said shaft has a threaded stud and said [fastening] *securing* member is a nut engageable with said threaded stud.

6. A rotary cutter as claimed in claim 1, 2, 3, [4 or 5] *or 4* wherein said shaft has a cut-off portion and said aperture is formed with an aperture projection, whereby said shaft is prevented from rotating through engagement of said cut-off portion by said aperture projection.

7. A rotary cutter as in claim 1, wherein [said handle and said head portion define] a space *is formed* between said bearing [projection] *means* and said head head portion into which the portion of said disc blade subjected to said curved elastic deformation is deformed.

8. A rotary cutter as in claim 2, wherein [said handle and said head portion define] a space *is formed* between said [bearing projection] *ring* and said head portion into which the portion of said disc blade subjected to said curving elastic deformation is deformed.

9. A rotary cutter as in claim 3, wherein [said handle and said head portion define] a space between said [bearing projection] *boss* and said head portion into which the portion of said disc blade subjected to said curved elastic deformation is deformed.

10. A rotary cutter as in claim 1, wherein said shaft is nonrotatably mounted to said handle so that said disc blade is rotatable relative to said shaft and said handle.

11. A rotary cutter as in claim 1, wherein said bearing [projection] *means* is fixed against rotation with said disc blade.

12. A rotary cutter as in claim 1, wherein said bearing [projection] *means* and said head portion bear on said disc blade only at said [radially spaced locations] *central portion and said peripheral portion.*

13. A rotary cutter as in claim 7, wherein said bearing [projection] *means* and said head portion bear on said disc blade only at said [radially spaced locations] *central portion and said peripheral portion.*

14. A rotary cutter as in claim 8, wherein said bearing [projection] *means* and said head portion bear on said disc blade only at said [radially spaced locations] *central portion and said peripheral portion.*

15. A rotary cutter as in claim 9, wherein said bearing [projection] *boss and said head portion bear on said disc blade only at said* [radially spaced locations] *central portion and said peripheral portion.*

*16. A rotary cutter as claimed in claim 5, wherein said shaft has a cut-off portion and said aperture is formed with an aperture projection, whereby said shaft is prevented from rotating through engagement of said cut-off portion by said aperture projection.*

* * * * *